April 24, 1962 — C. H. REYNER — 3,030,830
FAUCET STEM REPAIR HOLDERS
Filed Jan. 11, 1960

*INVENTOR.*
CHARLES H. REYNER
BY
*Alexander & Powell*
ATTORNEYS

United States Patent Office 3,030,830
Patented Apr. 24, 1962

3,030,830
FAUCET STEM REPAIR HOLDERS
Charles H. Reyner, Petoskey, Mich., assignor to
Jay Bain, Petoskey, Mich.
Filed Jan. 11, 1960, Ser. No. 1,578
3 Claims. (Cl. 77—62)

This invention relates to repair holders for use in supporting various sizes of faucet stems, while at the same time guiding a drill axially into the washer-supporting head portion of the stem and gauging the depth to which the bore in the head is being drilled.

It is a principal object of this invention to provide an improved repair holder of the type set forth above, said holder being especially adapted for the support during drilling of faucet stems by gripping the stem portion below the head portion, which head portion includes the washer-supporting cup. A specialized structure for the faucet stem repair holder is necessary because of the shape of the faucet stem to be supported thereby. Ordinarily drilling jigs have a V-block for supporting bar stock while being axially drilled, but these known structures would not properly support a faucet stem by holding the stem portion in a V-block arrangement while providing clearance for permitting the head section thereof to overlie the upper surface of the V-block in the manner to which the present structure is particularly adapted.

It is another very important object of my invention to provide a repair holder having a drill-guide bar extending over the V-block, said guide bar having a plurality of different size guide holes therethrough, said holes being sized to receive the drills and/or taps corresponding respectively with standard sizes of faucet-washer retaining screws.

Still a further object of the invention is to provide a repair holder assembly wherein the entire V-block is adjustable toward and away from the drill-guide bar so that, when the faucet stem is supported on the V-block with the head portion of the stem overlying the upper surface of the V-block, the distance between the head portion and the drill-guide bar can be adjusted so as to adjust the depth of the axial bore to be drilled in said head portion.

Other objects and advantages of the invention will become apparent during the following discussion of the drawings, wherein.

Figure 1:
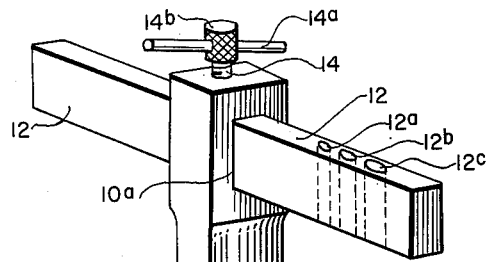
FIG. 1 is a perspective view of the novel repair holder showing a faucet stem supported in the holder and aligned with one of the holes in the drill-guide bar.
Figure 2:
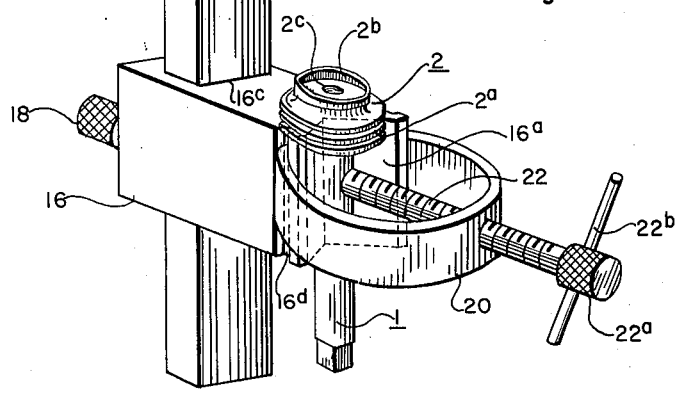
FIG. 2 is a plan view of the repair holder illustrated in FIG. 1.
Figure 3:
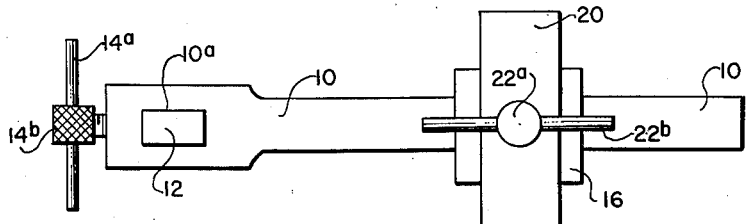
FIG. 3 is a left-end view of the repair holder shown in FIG. 2.

Referring now to the drawings, the repair holder in FIG. 1 is illustrated supporting a faucet stem comprising a stem portion 1 joining a head portion 2 at its upper end, said head portion 2 including a threaded section 2a and a washer cup 2b. An axial bore 2c is shown as extending downwardly into the faucet stem, and it is in connection with the drilling of this bore that the present repair holder is of particular utility. The faucet stem itself forms no part of the present invention.

The novel repair holder comprises a supporting bar 10 having a transverse bore 10a through its upper end. A drill-guide bar 12 extends through the transverse bore 10a and is a snug fit therein, this guide bar 12 having a plurality of drill-guide holes 12a, 12b and 12c therethrough for the purpose herein discussed. Means for locking the guide bar 12 in the transverse bore 10a comprises a screw 14 which may be provided with a transverse pin 14a through its head 14b.

The main support bar 10 also carries the V-block 16 which has a V-groove 16a at its outer end, the two sides of the groove 16a terminating at a line which comprises the apex 16b disposed parallel with the support bar 10. The V-block 16 has an opening 16c therethrough to receive the guide bar 10, and is further provided with clamping means comprising a screw 18 which is engaged in a threaded bore (not shown) in the V-block 16. When the screw 18 is tightened it clamps the V-block on the support bar 10 at a selected distance below the guide bar 12.

The V-block 16 is provided with opposed slots 16d into which the ends of a yoke 20 extend. This yoke has a threaded bore 20a disposed opposite the apex 16b of the V-block, and this bore 20a receives screw means 22 which, as can be seen in FIG. 1, clamps the stem portion 1 of the faucet stem tightly in place against the V-block. The screw means 22 has a head 22a and a pin 22b passed through the head in order to facilitate manual rotation of the latter.

In operation, the faucet stem is clamped in the V-groove 16a by tightening the screw means 22 against the stem portion 1, as illustrated in FIG. 1. The shoulder formed by the head portion of the faucet stem overlies the upper surface of the V-block 16 and is supported thereon against downward displacement.

The screw 14 is loosened and the drill-guide bar 12 is moved back and forth until the proper drill-guide hole 12a, 12b or 12c is brought into alignment with the axis of the faucet stem, and in particular with the axis of the bore 2c to be drilled. The screw 14 is then tightened.

Next, the screw 18 is loosened and the V-block 16 is raised or lowered on the support bar 10 in order to place the head portion of the faucet stem at such a distance beneath the upper surface of the guidebar 12 that the length of the drill bit extending from and supported in a drill chuck will drill a bore 2c of the desired axial depth into the head 2 of the faucet stem. When this position of the V-block 16 has been properly established, the screw 18 is re-tightened and the bore 2c is then drilled into the stem. When this bore has been drilled, the screw 14 can be again loosened and the guide bar 12 can be moved to a new position in which a larger hole is brought into alignment with the axis of the faucet stem, and this larger hole can then be used to support a thread tap during tapping of the bore 2c in the faucet stem.

I do not limit my invention to the exact form shown in the drawings, for changes may be made therein within the scope of the following claims.

I claim:

1. A repair holder for use in supporting a faucet stem and gauging the depth of a bore being axially drilled into the head portion thereof, said head porting being of larger diameter than its stem portion, comprising an elongated support bar having a transverse bore through one end; a stem supporting V-block having an opening therethrough parallel with and spaced from the line formed by the apex of the V-groove; means for maintaining said apex line and the axis of said transverse bore in a common plane; clamping means for securing the support bar at a selected position in the opening; a yoke fixed to said block facing its V-groove; screw means through said yoke in clamping relation with the V-groove; a guide bar having at least one drill-guide hole therethrough and said guide bar passing through said transverse bore in the support bar; and means for locking the guide bar with its drill-guide hole directed toward the V-block and yoke, said head portion overlying the surface of the block facing the guide bar and said stem portion being clamped in said V-groove.

2. In a repair holder as set forth in claim 1, said bars and said transverse bore and said opening in the V-block being rectangular in cross-section and comprising said means for maintaining said line and said axis in a common plane with the axis of the drill-guide hole.

3. In a repair holder as set forth in claim 1, said drill-guide bar having a plurality of different-size guide holes therethrough sized to receive the drills and taps corresponding with standard sizes of faucet washer retaining screws.

References Cited in the file of this patent

UNITED STATES PATENTS

| | | |
|---|---|---|
| 2,242,792 | Panzer | May 20, 1941 |
| 2,645,951 | Sponsler | July 21, 1953 |